United States Patent [19]

Sepulveda et al.

[11] Patent Number: 4,548,032

[45] Date of Patent: * Oct. 22, 1985

[54] METHOD OF DISTRIBUTING FUEL FLOW TO AN ANNULAR BURNER FOR STARTING OF A GAS TURBINE ENGINE

[75] Inventors: Domingo Sepulveda, Vernon; Edmund E. Striebel, South Windsor, both of Conn.

[73] Assignee: United Technologies Corporation, Hartford, Conn.

[*] Notice: The portion of the term of this patent subsequent to Nov. 29, 2000 has been disclaimed.

[21] Appl. No.: 516,508

[22] Filed: Jul. 25, 1983

Related U.S. Application Data

[62] Division of Ser. No. 287,852, Jul. 29, 1981, Pat. No. 4,417,439.

[51] Int. Cl.³ .............................................. F02C 7/26
[52] U.S. Cl. ................................ 60/39.06; 60/39.141
[58] Field of Search ................ 60/39.06, 39.141, 739, 60/740, 742, 746, 747, 39.826

[56] References Cited

U.S. PATENT DOCUMENTS

| | | | |
|---|---|---|---|
| 2,701,164 | 2/1955 | Purchas, Jr. et al. | 60/742 X |
| 3,158,998 | 12/1964 | Robinson et al. | 60/742 X |
| 3,763,650 | 10/1973 | Hussie et al. | 60/742 X |
| 4,062,183 | 12/1977 | Davies et al. | 60/39.141 X |
| 4,417,439 | 11/1983 | Sepulveda et al. | 60/39.141 |

Primary Examiner—Louis J. Casaregola
Assistant Examiner—Donald E. Stout
Attorney, Agent, or Firm—Norman Friedland

[57] ABSTRACT

Improvement to the starting characteristics of an annular combustor for a gas turbine engine that employs dual fuel nozzles (primary and secondary fuel flow systems) by redistributing the total fuel admitted to the nozzles in an asymmetrical pattern to deliver the requisite amount of fuel to the igniter by the primary flow system feeding fuel to that igniter.

2 Claims, 2 Drawing Figures

METHOD OF DISTRIBUTING FUEL FLOW TO AN ANNULAR BURNER FOR STARTING OF A GAS TURBINE ENGINE

This is a division of application Ser. No. 287,852, now U.S. Pat. No. 4,417,439, filed on July 29, 1981.

TECHNICAL FIELD

This invention relates to the fuel system of a gas turbine engine and particularly to means for improving starting of the engine.

BACKGROUND ART

This invention serves to solve an engine start problem in an annular type of combustor that includes a plurality of equally spaced dual fuel nozzles feeding fuel into the combustor. In the context of this patent application the term dual nozzle is a single fuel nozzle that houses both a primary and secondary flow system and each system is referred to as the primary nozzle and secondary nozzle, respectively. In this type of burner construction, as for example, that exemplified by the JT9D engine model manufactured by Pratt & Whitney Aircraft Group of United Technologies Corporation, the assignee of this patent application, each fuel nozzle is identical and each fuel nozzle delivers substantially the same amount of fuel to the combustor. Typically, in such a dual nozzle the primary nozzle is operable over the entire engine operating envelope and delivers, say 75% of fuel during idle and 10% during takeoff. The secondary nozzle, typically is utilized solely during higher thrust operations and delivers 30% of the total fuel during idle and 90% during takeoff. The total fuel flow is metered by a fuel control and distributed by a diverter valve to the fuel manifolds communicating with these nozzles.

In a conventional gas turbine engine, as the JT9D engine model, supra, starting fuel flow (600–800 pounds per hour total) is provided to all fuel nozzles, and as noted above, the distribution is even through all the nozzles. The fuel is typically atomized by pressure or aerated and mixes with air to form a combustible mixture. Combustion is initiated by exposing this mixture to a high energy igniter which remains activated for a given period of time, until at least after, combustion ensues.

Because of mechanical limitation within the combustor and engine, such as starting during other than optimum starting temperatures (as for example cold days) or where the nozzle and igniter design configuration may not be at optimum, the operator may induce increased amounts of fuel flow to achieve starting. Under such circumstances, the starting times tend to become longer and fuel tends to accumulate or form puddles in the combustion chamber, consequently causing undesirable hot starts with a tendency of increasing the incidence of compressor stall.

We have found we can improve the incidence of starting and starting times by making an otherwise symmetrical nozzle/fuel injection system in an annular combustor into an asymmetrical system. It is contemplated by this invention that simple flow restrictors are incorporated in all of the non-igniter located primary nozzles and the igniter located primary nozzles remain in tact (unrestrictive). Hence, in an already existing system, the starting characteristics are improved by merely adding flow restrictors at judicious locations—say in a twin igniter system, 18 of 20 nozzles are restricted. This allows the use of existing hardware and does not necessitate the change of the fuel flow requirements and its fuel metering and distribution systems.

Other means for achieving optimum starting are contemplated within the scope of this invention, as for example, plugging a limited number of primary nozzles, changing the flow characteristics of the igniter located nozzles, and the like. The important aspect of this invention is that the amount of fuel distributed to the igniter to obtain optimum starting characteristics is preascertained and the fuel from the distribution system distributing an already established fuel flow is redistributed to an asymmetrical distribution pattern to achieve the requisite predetermined amount of the fuel to the igniter nozzle.

This serves to limit the quantity of fuel in the restrictive nozzles while increasing the quantity in the unrestrictive nozzles. The amount of fuel selected in the unrestrictive nozzles is preascertained to achieve optimum starting. Hence the size of restrictor is predetermined to achieve the quantity of flow necessary in the unrestrictive nozzle.

DISCLOSURE OF INVENTION

An object of this invention is to provide for a gas turbine enqine of the type emplovinq an annular combustor improved starting means. A feature of this invention is to establish the quantitv of fuel necessarv to supplv the igniter for optimum startinq and redistribute the fuel delivered to the fuel nozzles in an asvmmetrical pattern to achieve the preselected amount. Another feature is to modify the fuel flow pattern in the primary fuel nozzles of a dual fuel nozzle system so that each nozzle not associated with an igniter includes an upstream disposed restrictor. Such a system is characterized as being simple to modify existing hardware, relatively inexpensive and allows all the fuel nozzles to be identical.

Other features and advantages will be apparent from the specification and claims and from the accompanying drawings which illustrate an embodiment of the invention.

BEST MODE FOR CARRYING OUT THE INVENTION

While this invention in its preferred embodiment is utilized with an annular combustor for a gas turbine engine where twenty dual fuel nozzles are symmetrically spaced in the dome of the combustor the location and the number of the fuel nozzles do not constitute a limitation of the scope thereof. Suffice it to say that the invention solves the starting problems in an annular combustor having homogeneous fuel flow in a dual fuel nozzle system. The method of achieving improved starting characteristics in such a system is to preascertain the quantity of fuel that should be delivered to the igniter for the conditions desired for optimum starting. Once this value is established and knowing the total quantity being metered by the fuel system to each nozzle, the symmetrical distribution pattern can be changed to an asymmetrical pattern to flow the necessary fuel in the primary fuel nozzle associated with the igniter. In the context of this patent application the nozzle that is positioned to deliver the necessary fuel to the igniter is referred to as the igniter fuel nozzle and the others are referred to as the non-igniter fuel nozzle.

Figure 1:
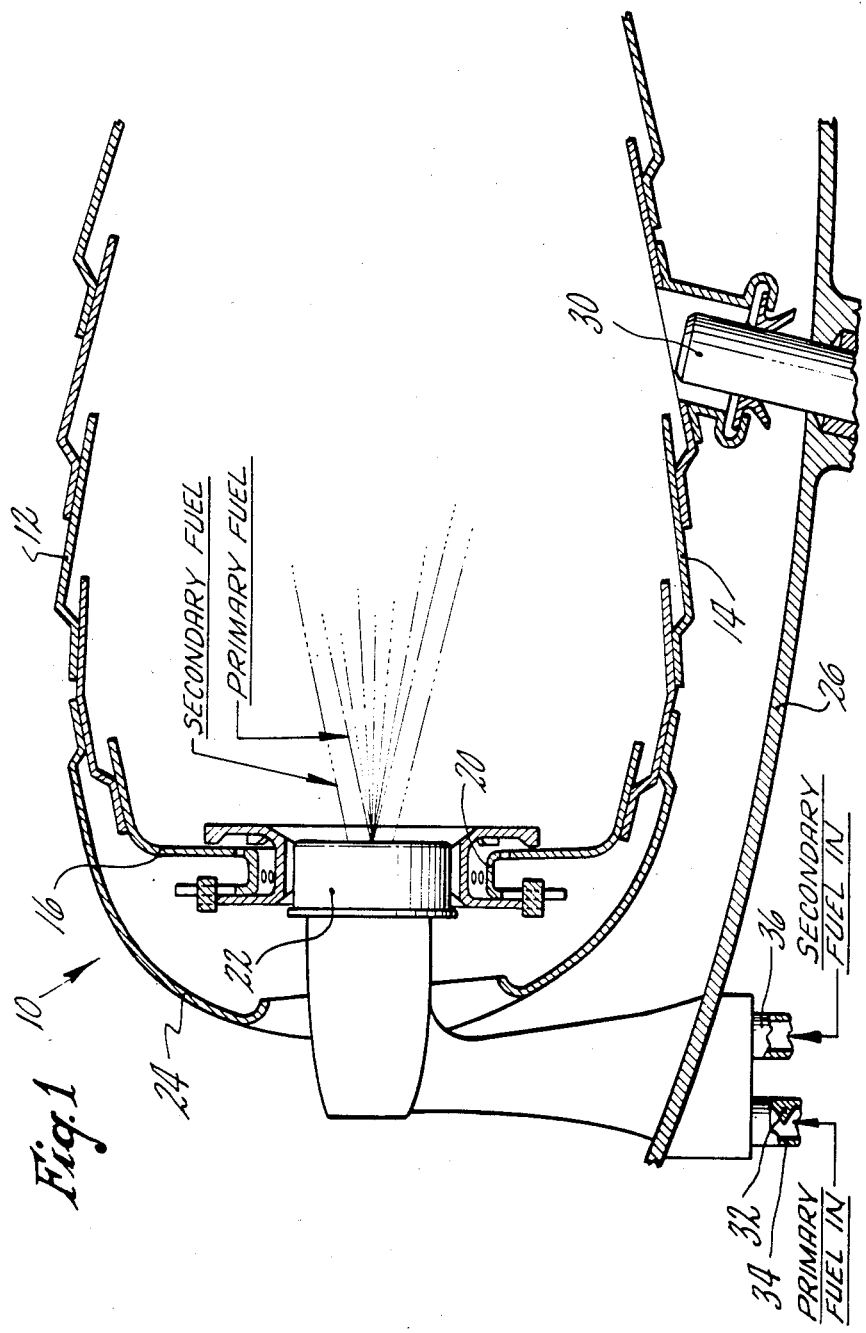
FIG. 1 is a partial view partly in elevation and partly in section schematically illustrating a typical annular combustor having a dual fuel nozzle with a primary and secondary fuel system.
Figure 2:
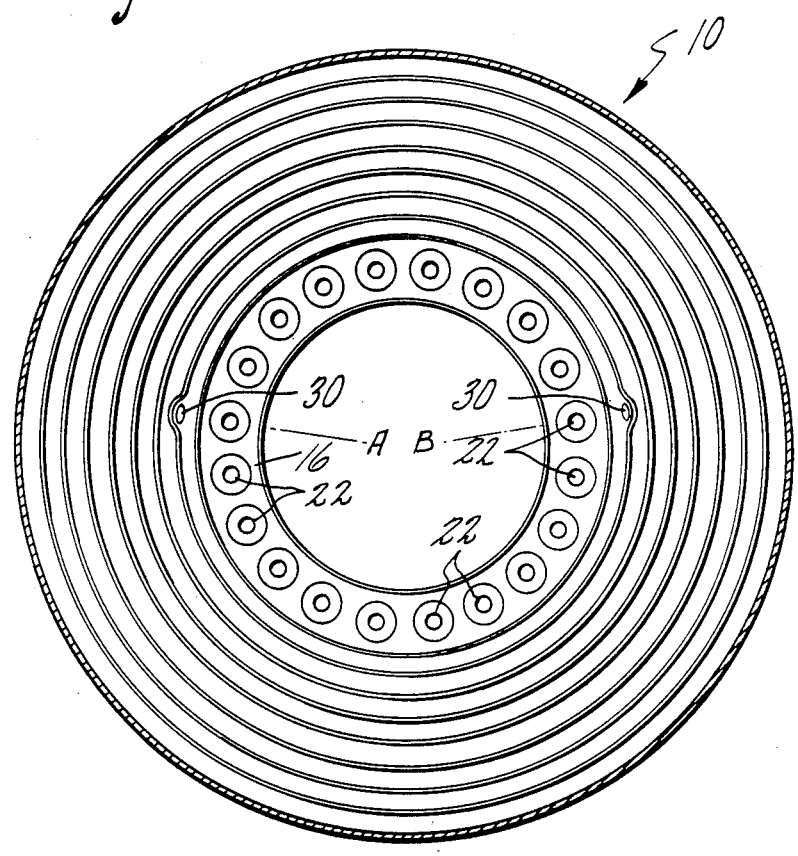
FIG. 2 is a schematic view showing the relationship of the fuel nozzles relative to the igniter in a typical combustion system.

As noted in FIGS. 1 and 2, the annular combustor generally illustrated by reference numeral 10 is defined by a conventional louvered constructed outer annular member 14 and the radially spaced and concentrically mounted inner annular louvered constructed member 12. The forward end relative to the flow of combustion products is closed by a dome 16 which carries a plurality of circumferentially spaced openings 20 (twenty in number) for receiving the twenty fuel nozzles 22 (one being shown in FIG. 1) suitably supported by the diffuser case 26. The front end is customarily encapsulated by a hood 24 attached to the inner and outer annulii. The details of the combustor and associated nozzles are eliminated herefrom for the sake of convenience and simplicity, but such details can be obtained by referring to the JT9D engine model, supra.

Suffice it to say that each fuel nozzle 22 is of the dual fuel system continuously delivering fuel through the primary nozzle during the entire engine operating cycle and through the secondary nozzle solely upon the higher thrust regimes. Typically and as shown herein such combustors carry two igniters 30 which also are commercially available and in this instance bears a ratio relation of the height of the dome to the axial distance from the nozzle and generally falls within the range of 0.5 to 1.0.

In accordance with this invention a suitable restrictor 32 is mounted in eighteen of the primary fuel lines 34 (one being shown) upstream of the primary nozzle exit. The secondary fuel lines 36 (one being shown) remains unchanged. Hence, in this preferred embodiment and as noted in FIG. 2, both of the fuel nozzles at stations A and B remain unchanged and all of the primary nozzles of the remaining eighteen fuel nozzles at the other stations not aligned with the igniters are modified to include the upstream restrictors 32.

In an actual demonstration where an existing homogeneous fuel nozzle system that flowed thirty pounds of fuel per hour (PPH) per nozzle was employed, and which was modified to include eighteen restrictive passages, the optimum ignition was established where the igniter fuel nozzle delivered fuel at 52 PPH. By merely restricting flow to the eighteen non-igniter primary nozzles to reduce the flow to approximately 28 PPH increased fuel in the igniter fuel nozzles without changing anything else in the system. The amount of fuel to the igniter nozzles was preascertained by empirical data for a given engine's gooid starting characteristics and the engine was subsequently tested with the redistributed fuel flow.

Obviously, since the primary fuel flow accounts for only 10% of the total flow during high power performance, this modification had virtually no impact on performance and pressure drop. At idle power where the primary fuel flow accounts for a large percentage of the total flow, say 50–75%, the restrictive passageway configuration had a significant impact on the engine operation and such impact was favorable. Such a system has shown to reduce starting times and minimizes hot starts and compressor stall.

It should be understood that the invention is not limited to the particular embodiments shown and described herein, but that various changes and modifications may be made without departing from the spirit and scope of this novel concept as defined by the following claims.

We claim:

1. The method of starting a gas turbine engine of the type that includes an annular combustor that receives a predetermined total amount of fuel during said starting condition, a plurality of dual fuel nozzles symmetrically disposed about the circumference of the annular combustor, and an igniter adjacent to at least one of said dual fuel nozzles, and each dual fuel nozzle includes a primary fuel system and a secondary fuel system being supplied a given amount of fuel, including the steps of:

calculating the amount of fuel to be supplied to the igniter fuel nozzle from data established from said gas turbine engine to achieve starting, and the amount of fuel to be supplied to the remaining dual fuel nozzles, redistributing said given amount of fuel for said starting condition to all of the primary fuel systems of all of said duel fuel nozzles to provide the amount of fuel ascertained from the above previous step, so that the calculated amount of fuel to the igniter fuel nozzle is greater than the calculated amount delivered to each of the adjacent dual fuel nozzles, and initiating starting of the gas turbine engine with the preascertained amount of fuel.

2. The method as in claim 1 including the step of flowing the fuel to each of the primary fuel nozzles not associated with the igniter through a fixed restrictor.

* * * * *